July 11, 1967
R. D. FRYE ET AL
3,330,023
APPARATUS FOR PRODUCING HOSE COUPLINGS
Filed March 26, 1962
4 Sheets-Sheet 1
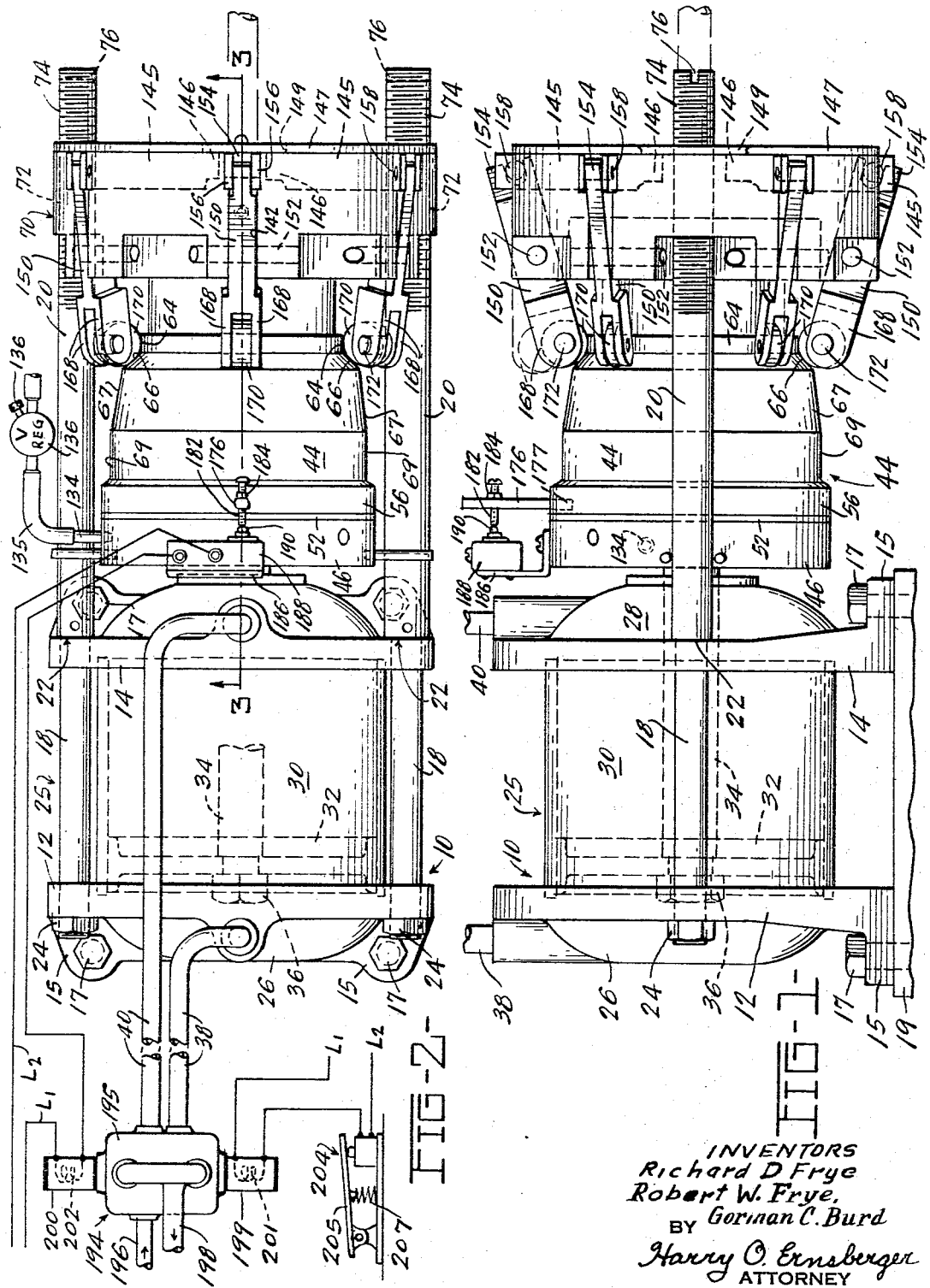
INVENTORS
Richard D Frye
Robert W. Frye,
BY Gorman C. Burd
Harry O. Ernsberger
ATTORNEY

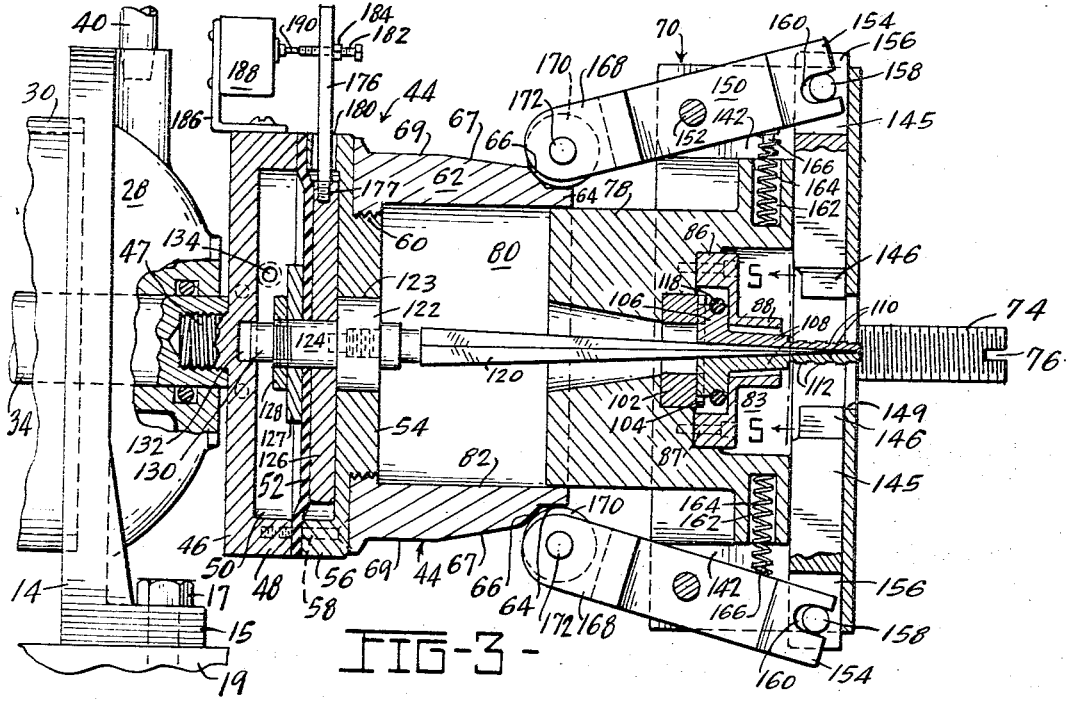
FIG-3-
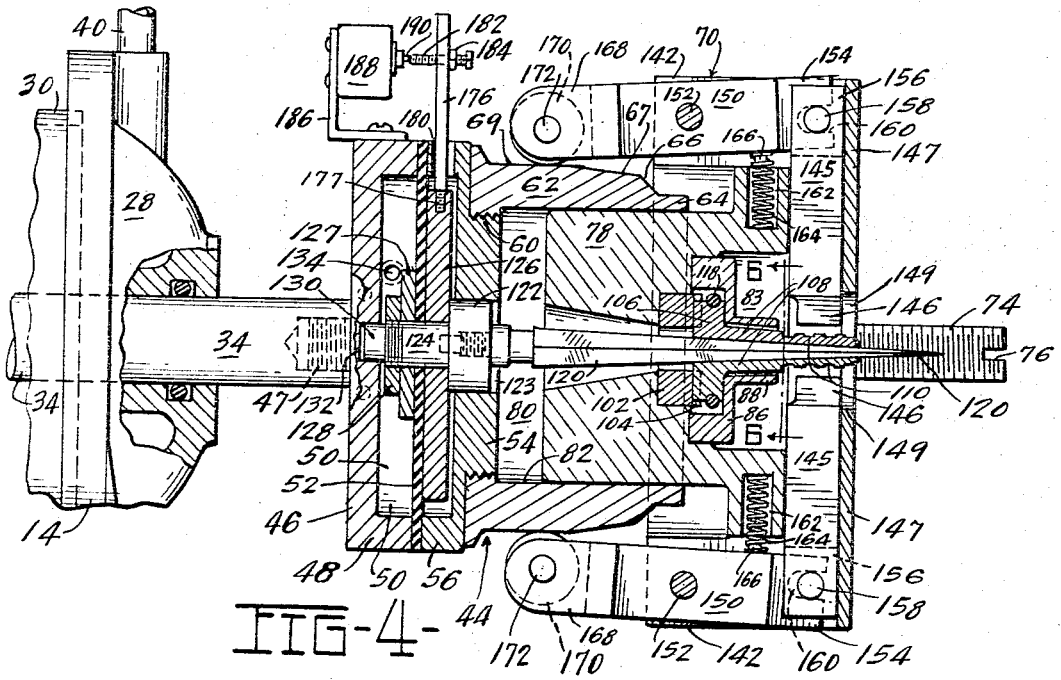
FIG-4-
INVENTORS
Richard D. Frye
Robert W. Frye.
BY Gorman C. Burd.
Harry O. Ernsberger
ATTORNEY

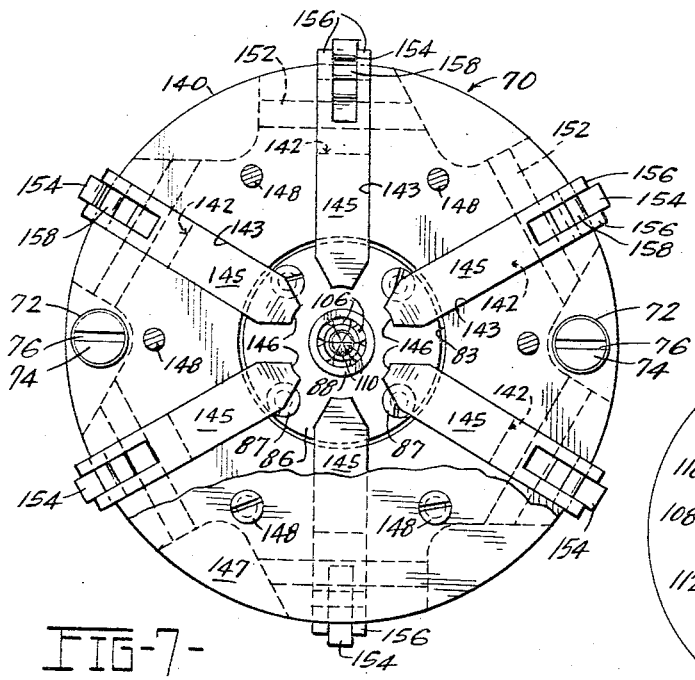
FIG-7-
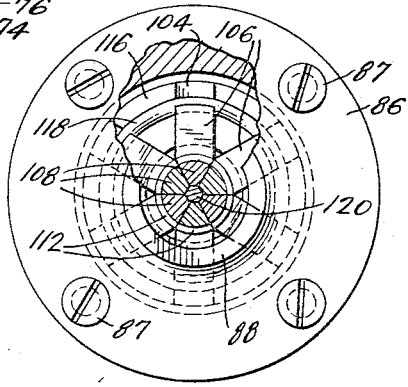
FIG-5-
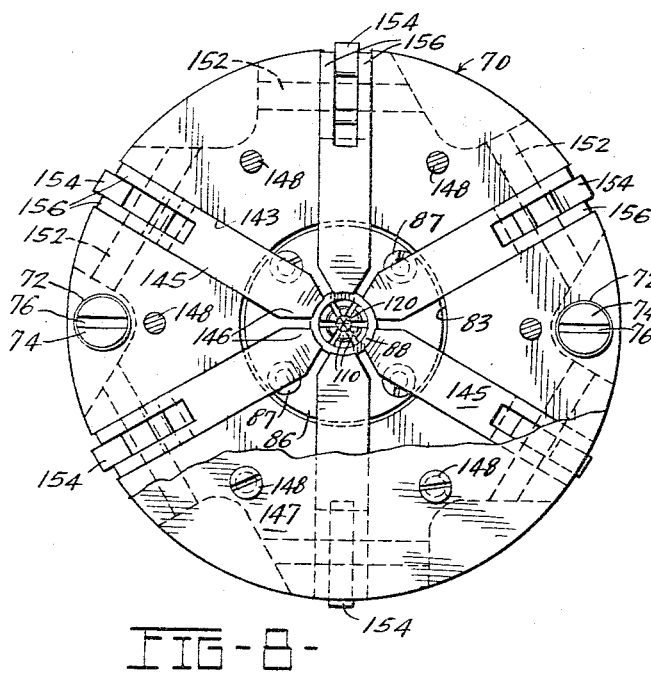
FIG-8-
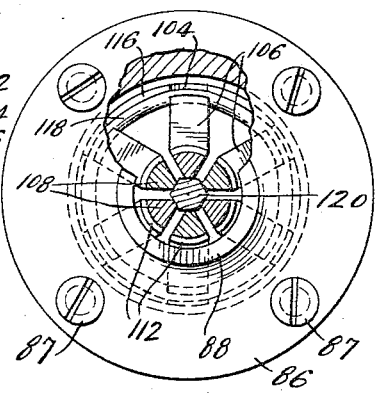
FIG-6-
INVENTORS
Richard D. Frye
Robert W. Frye,
Gorman C. Burd.
BY
Harry O. Ernsberger
ATTORNEY July 11, 1967 R. D. FRYE ET AL 3,330,023
APPARATUS FOR PRODUCING HOSE COUPLINGS
Filed March 26, 1962 4 Sheets-Sheet 4
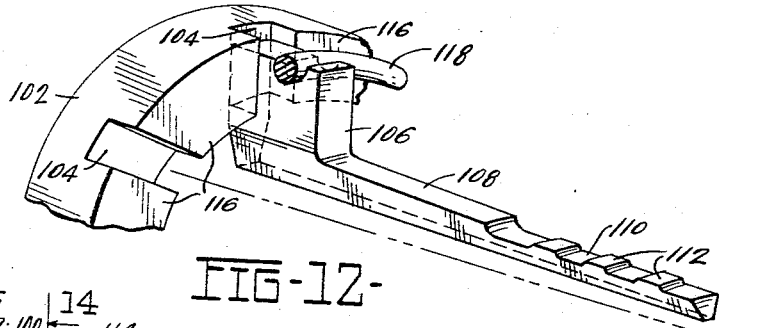
FIG-12-
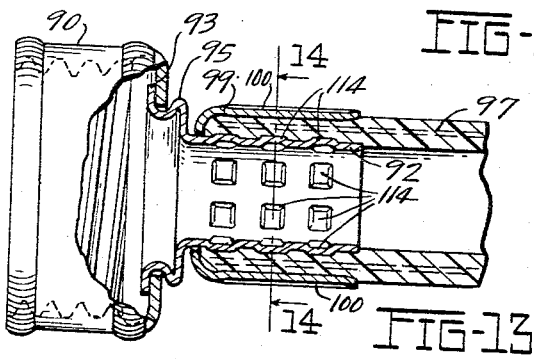
FIG-13-
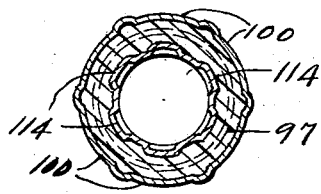
FIG-14-
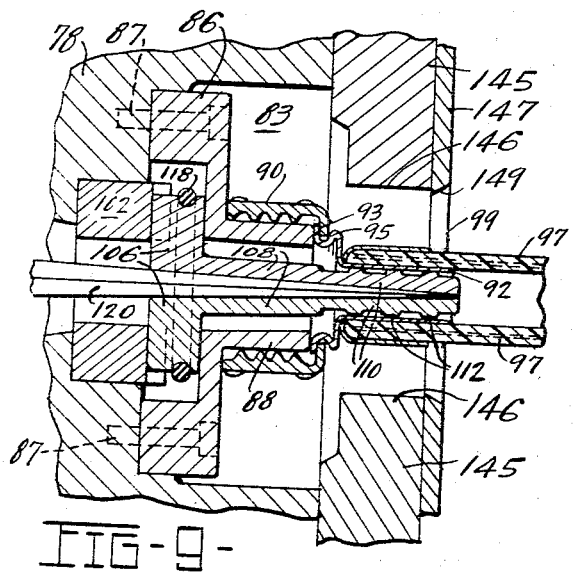
FIG-9-
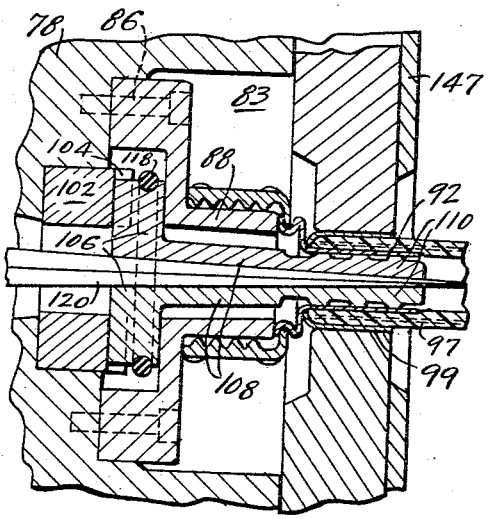
FIG-10-
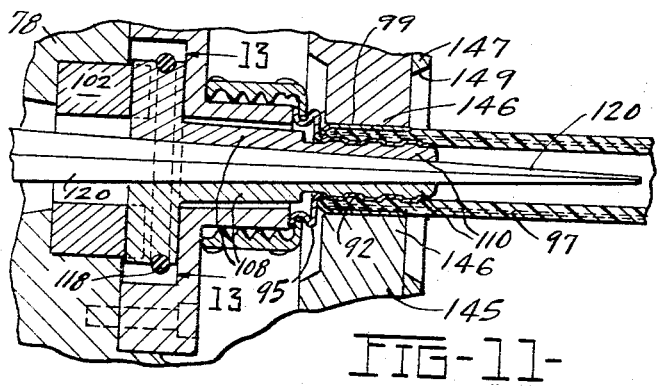
FIG-11-
INVENTORS
Richard D. Frye
Robert W. Frye,
BY Gorman C. Burd
Harry O. Ernsberger
ATTORNEY United States Patent Office 3,330,023
Patented July 11, 1967

3,330,023
APPARATUS FOR PRODUCING HOSE COUPLINGS
Richard D. Frye, Erie, Mich., and Robert W. Frye and Gorman C. Burd, Toledo, Ohio, assignors to Neo Products Corporation, Erie, Mich., a corporation of Michigan
Filed Mar. 26, 1962, Ser. No. 183,333
9 Claims. (Cl. 29—237)

This invention relates to an apparatus for assembling hose coupling construction embodying a ferrule which is contracted or crimped during assembly and a cooperating nipple configuration which is expanded within a flexible hose for establishing a fluid tight connection with the hose.

In hose coupling constructions of conventional character, a fitting having a nipple portion of substantial length is inserted in the end region of a hose and a ferrule of substantial length placed over the exterior region of the hose adjacent the nipple portion and the nipple expanded within the hose to form a connection.

Hose couplings of this character have not been entirely satisfactory particularly when the hose is subjected to substantial internal fluid pressures as the hose tends to become dislodged and forced away from the nipple and ferrule even though the nipple is expanded against the interior wall of the hose construction. This difficulty is particularly encountered in constructions where the hose component is formed of resinous plastic as the plastic is endowed with "cold flow" characteristics. With the use of plastic hose, the internal pressures established in fluids within the hose tend to cause the plastic to "cold flow" or be withdrawn from the region between the ferrule and the nipple. When the initiation of this withdrawal of the plastic under pressure takes place, the cross section of the plastic hose between the nipple and the ferrule is reduced and the hose thereafter quickly separates from the nipple.

In affixing couplings of this character to rubber hose which is reinforced by textile embedded in the rubber, the expansion of the nipple stresses the textile and weakens it and, under fluid pressure within the hose, the weakened textile may be fractured and an effective sealed connection destroyed.

The present invention embraces an apparatus for assembling a hose coupling provided with a nipple arranged to extend into the interior end region of a flexible hose in combination with a ferrule telescoped on the exterior of the hose region adjacent the nipple wherein the nipple is expanded and the ferrule contracted or crimped to provide an effective seal which will withstand high internal pressures without impairing the seal or dislodging the hose from the nipple and ferrule components.

Another object of the invention resides in the provision of apparatus for expanding a tubular element of a hose coupling throughout substantially its entire length after the tubular element has been inserted in the end region of a flexible hose and concomitantly contracting a ferrule surrounding the region of the hose adjacent the tubular element to establish an interlocking connection of the nipple and ferrule components with the hose.

Another object of the invention is the provision of apparatus for contracting a ferrule surrounding a region of a flexible hose through the simultaneously inward radial movements of a plurality of members engageable with the exterior surface of the ferrule to effect a substantially uniform crimping of regions of the ferrule throughout its periphery.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

FIGURE 1 is a side elevational view of a form of novel apparatus for carrying out the method of the invention;

FIGURE 2 is a top plan view of the apparatus illustrated in FIGURE 1;

FIGURE 3 is a longitudinal sectional view taken substantially on the line 3—3 of FIGURE 2;

FIGURE 4 is a view similar to FIGURE 3 illustrating the nipple expanding and ferrule crimping components in their respective positions at the completion of a nipple expanding and ferrule crimping operation;

FIGURE 5 is a fragmentary detail sectional view taken substantially on the line 5—5 of FIGURE 3;

FIGURE 6 is a fragmentary detail sectional view taken substantially on the line 6—6 of FIGURE 4;

FIGURE 7 is an end view of the arrangement shown in FIGURE 3;

FIGURE 8 is an end view of the arrangement illustrated in FIGURE 4;

FIGURE 9 is an enlarged view of a portion of the constuction illustrated in FIGURE 3 showing the components of the coupling construction in an initial position in the apparatus;

FIGURE 10 is a view similar to FIGURE 9 illustrating a progression of steps in the method of affixing a nipple and ferrule to a hose;

FIGURE 11 is a view similar to FIGURE 10 showing the completion of steps of the method in securing the nipple and ferrule to a hose;

FIGURE 12 is an isometric view of one of the nipple expander components and its mounting;

FIGURE 13 is an elevational view partly in section of the components of a hose coupling with the nipple expanded and the ferrule in crimped condition; and FIGURE 14 is a detail sectional view taken substantially on the line 14—14 of FIGURE 13.

Referring to the drawings in detail and initially to FIGURE 1 through 4, the apparatus or machine for carrying out the method of the invention is inclusive of a frame structure 10 which embraces spaced end members 12 and 14. The frame members 12 and 14 are held in spaced relation by portions 18 of rods or frame members 20, rod portions 18 of the rods 20 are of slightly lesser diameter than the portions 20, and the juncture of the portions 18 with the rod portions 20 provided ledges 22 arranged to be engaged by the frame member 14.

The frame member 12 is provided with openings to accommodate the rods 18, and nuts 24 are threaded on the ends of the rod portions 18 to secure the frame members 12 and 14 in spaced fixed relation. The members 12 and 14 are provided with base flanges 15 which are bored to accommodate bolts 17 which may be threaded into a support 19.

In the embodiment illustrated, the frame members 12 and 14 are respectively fashioned with head portions or end heads 26 and 28 which form components of a fluid motor or fluid actuator 25. Disposed between the end heads 26 and 28 is a circular cylinder 30 forming a component of the actuator 25 in which is reciprocably disposed a piston 32 mounted upon a piston rod 34, the piston being secured to the rod by a clamping nut 36. The end head 26 is of hollow or channeled configuration to receive and direct fluid under pressure against the piston, a tube 38 being connected with the head 26 to convey fluid into and away from the left end of the cylinder 30 as viewed in FIGURE 2.

The head 28 is of hollow or channeled configuration to convey fluid under pressure against the piston 32 to return the piston, after reciprocation of the same in a right-hand direction as viewed in FIGURE 1, to its left-hand position, a tube 40 being connected with the head 28 to convey pressure fluid into and waste fluid away from the right end of the actuator 25. The motor or actuator 25 illustrated is of the fluid actuated type and may be operated by compressed air or liquid, such as oil, under pressure.

Mounted upon the piston rod 34 is a first means or head 44 which is shown in detail in FIGURES 3 and 4. The head 44 is inclusive of a body 46 having a threaded tenon 47 threaded into an opening in the end of the piston rod 34 thus securing the body 46 to the piston rod. The body member 46 is fashioned with a peripheral flange 48 forming a disc-like chamber 50. A flexible imperforate diaphragm or membrane 52 is engaged with the peripheral flange 48 and forms a flexible wall of chamber 50.

Arranged adjacent the diaphragm is a closure member or plate 54 having a peripheral flange 56 of substantially the same diameter as the flange 48 and is aligned therewith, the peripheral flange 56 engaging the periphery of the diaphragm 52. A plurality of circumferentially spaced screws 58 extending through registering openings in the flanges 48 and 56 and through openings in the periphery of the diaphragm 52 securely hold these components in assembled relation as shown in FIGURES 3 and 4.

The member 54 is provided with a threaded tenon 60 upon which is threaded a cam means or member 62. The cam means or member is of circular shape, the periphery of which is fashioned with a circular cylindrical tenon 64, frusto-conically spaced cam surfaces 66 and 67 and a circular cylindrical or drum-like portion 69. The cam member 62 is supported by and movable with the closure plate 54 and the body 46.

The apparatus is inclusive of a second head construction 70. The head 70 is of generally circular shape as shown in FIGURES 7 and 8 and is formed with diametrically opposed threaded openings 72 through which extend the threaded portions 74 of the rods 20 forming components of the frame construction. The extremities of the rods 20 adjacent the threaded regions are each formed with a kerf 76 to receive a suitable tool for rotating the rods 20 to adjust the relative position of the head 70.

By releasing the securing nuts 24 on the opposite ends of the rods, the rods may be rotated and through the threaded connection of the rods with the head 70, the latter may be moved in either direction with respect to the head 44 and, after adjustment has been effected, the nuts 24 are drawn up to secure the rods 20 in a fixed position and thereby secure the head 70 in a relatively fixed position.

The head 70 is fashioned with a cylindrical portion 78 which snugly, yet slidably, is received in a chamber or recess 80 defined by a circular wall 82 on the interior of the cam member or means 62 as particularly shown in FIGURES 3 and 4.

Through this arrangement the head 46 and cam means 62 are maintained in aligned relation with the portion 78 of the head 70 during reciprocating movements of the first head 44 with respect to the second head 70. The head 70 is fashioned with a chamber or recess 83 in which is positioned a member 86 adapted to support the components of a hose coupling construction or fitting during processing.

With particular reference to FIGURE 9, the member 86 being preferably of circular shape, is secured to the portion 78 of the head 70 by means of screws 87. The member 86 is fashioned with an outwardly extending tenon portion, hub or arbor 88 adapted to receive a threaded coupling component 90 of a hose fitting construction. The components of the hose fitting adapted to be processed through the use of the apparatus include a nipple portion 92 fashioned with a peripheral flange 93 disposed interiorly of the threaded coupling component 90.

The nipple is fashioned with an expanded ridge 95 which serves to secure the threaded coupling member 90 to the nipple 92 in a well-known conventional manner yet permitting relative rotational movement of the threaded coupling 90 with respect to the nipple. The coupling of this construction is adapted to be processed by the method and apparatus of the invention to secure the coupling construction upon the end region of a hose 97, a ferrule or comparatively thin-walled sleeve 99 being telescoped over the end of the hose and in transverse registration with the nipple portion 92 extending into the interior of the hose end.

The apparatus is inclusive of means for expanding the nipple portion 92 within the hose end 97. Secured in a recess formed in the portion 78 of the head 70 is an annular member 102 which is fashioned on one face with circumferentially spaced, radially arranged slots or guide passages 104. Snugly, yet slidably, fitted in the passages or slots 104 are members 106 provided with forwardly extending projections 108 which have extending portions 110, the projections 108 and portions 110 being of segmental shape as shown in FIGURES 5, 6 and 12. The segments or projections 110, during processing of a coupling construction, extend into the nipple portion as shown in FIGURES 9 through 11.

The outermost regions of the projections 110 are preferably fashioned with raised portions 112 which, when the segments or projections 110 are expanded, form spaced outwardly raised ridges or regions 114 on the nipple 92. The members 106 are maintained in radially spaced relation by portions 116 which define the side walls of the guide passages 104. The members 106 are biased toward a central axis by a resilient means 118 encompassing the members. The resilient means may be a band of rubber, a coil spring or other suitable resilient component.

The members 106 are adapted to be expanded in order to expand the nipple portion 92 by means of a tapered mandrel or expander 120. The interior surfaces of the members 106 and the exterior surface area of the mandrel 120 are fashioned with mating tapered regions whereby longitudinal movement of the tapered mandrel 120, through the central region of the members 106 and the projections 110, expands the portion 110 to expand the nipple portion 92.

The mandrel 120 is connected to an enlarged circular cylindrically shaped portion 122 which is slidably received in a bore 123 formed in the closure member 54. The mandrel construction, at the opposite side of the portion 122, is fashioned with a tenon 124 which extends through bores or passages formed in the member or disc 126, the diaphragm or membrane 52 and a washer 127. The tenon 124 is formed with a threaded region to accommodate a securing nut 128.

The end region of the tenon portion 124 is provided with a tenon portion 130 of reduced diameter which is adapted for snug, yet slidable engagement in a bore 132 formed in the body portion 46 of the head construction 44. The plate-like disc 126, the diaphragm 52, washer 127 and nut 128 are arranged for limited longitudinal movement within the chamber 50 for a purpose hereinafter explained. The chamber 50 is connected by means of a pipe 134 and a flexible tube 135 with a source of fluid under pressure such as compressed air, the pipe 134 extending through the flange 48 on the member 46 to introduce fluid under pressure into the chamber 50.

The flexible tube 135 is connected with a pressure regulator 136 in the compresed air supply line, the regulator being of a variable or adjustable type to vary or control the fluid pressure maintained within the chamber 50. With particular reference to FIGURES 3 and 4, longitudinal forward movement of the piston rod 34 moves the head construction 44 and components carried thereby forwardly or in a right-hand direction as viewed in FIGURE 4, the manderl 120 moving through the projections 110 expand the nipple portion 92 as shown in FIGURES 10 and 11.

The head 70 is equipped with circumferentially spaced means movable radially toward the axis of the mandrel 120 for crimping, compressing or distorting the ferrule 99 toward the axis of the mandrel to embed the ferrule in the exterior region of the hose construction 97 and compress the hose inwardly concomitantly with the outward expansion of the nipple 92 to secure the hose coupling or fitting in permanent sealing engagement with the hose 97. The head construction 70 is inclusive of a portion 140 fashioned with circumferentially spaced slots or recesses 142, each recess 142 communicating with a radially arranged recess 143.

Arranged in each of the radially arranged recesses 143 is a plunger 145, each of the plungers being fashioned at its innermost end with a ferrule engaging or crimping instrumentality or portion 146 for crimping or compressing the ferrule 99. The forward face of the head 70 is provided with a cover or closure plate 147 held in place by screws 148, the plate having a central opening 149 of a dimension to accommodate the hose coupling components to be processed. The inner surface regions of the plate 147 adjacent the plungers 145 provide guide means retaining the plungers 145 in the recesses 143.

Disposed in each of the slots 142 is a motion transmitting member, finger or lever 150, each of the members 150 being mounted upon a pivot shaft 152 carried by the head 70. Each of the members 150 has its forward region 154 extending into a slot between furcations 156 formed on a plunger 145.

Extending between and through the furcations 156 of each plunger 145 is a pin or stub shaft 158 and the adjacent portion 154 of a finger 150 is formed with an open ended slot or recess 160 receiving the stub shaft 158 to establish an articulate interconnection between a plunger and the adjacent member 150.

Formed in a portion of member 78 adjacent each of the fingers or members 150 is a bore 162, each bore accommodating an expansive coil spring 164, the springs engaging the fingers 150 as shown in FIGURES 3 and 4 for biasing the plungers 145 toward their outermost positions. Each of the fingers 150 is provided with a projection 166 which is engaged by the extremity of the adjacent spring 164 to prevent dislodgment of the spring relative to the finger.

The rear end portion of each of the fingers 150 is formed with a bifurcated extremity and disposed in the space between the furcations 168, shown in FIGURE 2, is a roller or cam follower 170, each of the cam followers being mounted upon a pin or stub shaft 172 extending through openings in the furcations and the roller or cam follower. The head 44 is provided with a frusto-conically shaped cam portion 67, a second frusto-conical cam portion 66 of more acute angularity terminating in a cylindrically shaped ledge or tenon portion 64.

The cam portion 67 is connected with a cylindrical portion 69 formed on the member 62. When the head 44 is at its extreme retracted position in a left-hand direction as viewed in FIGURE 3, the rollers 170 engage the peripheral surface of the ledge or flange 64.

In this position the plungers 145 are at their extreme outermost radial positions to facilitate disposing a hose coupling fitting and components in a position to be operated upon by the apparatus.

As the piston 34 moves forwardly, that is, in a right-hand direction as viewed in FIGURE 3, the rollers 170 ride outwardly under the influence of the cam surface 66 to move the portions 146 of the plunger 145 in adjacent relation to the ferrule 99. Thereafter as the mandrel 120 moves through the segments 110 to expand the nipple 92, the rollers 170 are moved outwardly but at a slower rate under the influence of the cam surface 67.

During the period of engagement of the rollers 170 with the cam surface 67, the plungers 145 are moved comparatively slowly radially inwardly, the portions 147 of the plungers engaging and crimping the ferrule 99 inwardly to compress the adjacent region of the hose 97 between the crimped ferrule 99 and the expanded nipple 92. When the ferrule has been crimped to a predetermined extent, that is, when the rollers 170 arrive at the terminus of the cam surface 67, the rollers 170 thereafter engage on the cylindrical surface 69 and during further forward movement of the head 44 no movement of the ferrule crimping members 146 takes place.

Secured to the plate-like member or disc 126 is a laterally extending bar or member 176, the bar having a threaded portion 177 threaded into a radial threaded opening in the plate 126.

The bar 176 extends through a slot 180 formed in the flange portion 56 of member 54 as shown in FIGURE 3, the slot 180 being elongated in the direction of longitudinal movement of the head 44. The bar 176 is provided with a threaded opening to receive a screw 182 which is adjustable in the bar 176 and which may be locked in adjusted position by means of a nut 184.

Mounted upon the member 46 is an L-shaped bracket 186 upon which is supported a micro switch 188 of conventional construction, an operative movable component or plunger 190 of the micro switch being disposed in the path of screw 182. Upon relative movement of the bar 176 in a left-hand direction, as viewed in FIGURE 3, the screw or abutment 182 engages and actuates the movable component 190 of the micro switch 188 to accomplish a purpose hereinafter explained.

The apparatus of the invention is controlled by electrically energized means for actuating valve means to control the ingress and egress of fluid under pressure alternately at opposite ends of the fluid actuator 25 through the pipes or tubes 38 and 40. With particular reference to FIGURE 2 the fluid conveying tubes or pipes 38 and 40 are connected with a solenoid-operated four-way valve means 194 of conventional construction.

The valve means 194 is connected by means of a pipe 196 with a source of compressed air or other fluid under pressure, and an outlet pipe 198 is connected with the valve means 194 to convey away spent air exhausted from the actuator 25.

The reciprocable valve (not shown) contained in the valve housing 195 is arranged to be moved alternately in opposite directions by electrically energizable solenoid mechanisms 199 and 200 provided with solenoid coils 201 and 202.

A foot operated switch 204, adapted to be actuated by an operator by depression of a pedal 205, is connected in series with coil 201 of solenoid 199, the coil and switch being connected with a current supply L1, L2. Movement of the foot operated switch to circuit-closing position energizes the solenoid 199 moving the fluid under control valve means 195 to direct fluid under pressure through tube 38 into the left-hand end of the actuator 25, as viewed in FIGURE 1. The foot operated switch is normally biased to open position by a spring 207 engaging the foot pedal or lever 205.

A current supply L1, L2 is connected with solenoid coil 202 and the micro switch 188, the latter being in series with the coil 202. The micro switch 188 is normally open and when the switch is closed by movement of the bar 176, the solenoid coil 202 is energized to move the valve means in housing 195 to direct fluid under pressure through pipe 40 to retract the piston 32.

The operation of the apparatus in carrying out the steps of the method of the invention is as follows: The head 44 and associated components are initially in the position illustrated in FIGURES 1, 2 and 3 wherein the tapered mandrel 120 is in a retracted position and the ferrule crimping members or instrumentalities 146 are in their outermost positions as illustrated in FIGURE 3.

The components of a hose coupling construction, shown in FIGURE 9, are assembled on a hose end 97, the ferrule 99 being first telescoped over the exterior end of the hose and the nipple portion 92 telescoped into the interior of the hose end, the threaded coupling component 90 being held in assembly with the nipple 92 by means of the circumferential ridge or bead 95. The operator fits the threaded coupling member 90 over the hub portion 88 of member 86, the other components occupying the positions shown in FIGURE 9.

The operator then depresses the pedal 205 to actuate the switch 204 completing an electric circuit through the coil 201 of the solenoid 199. The switch 204 is preferably of the type that is closed for a short period of time at each successive depression of the pedal 205 irrespective of whether the pedal is held depressed or released. The energization of the solenoid 199 moves the valve means in the housing 195 to a position establishing communication between the air inlet tube 196 and the tube 38.

Thus fluid under pressure, such as compressed air from a source connected with the air supply line 196, is conveyed into the left-hand end of the cylinder 30 of the actuator 25. Fluid pressure acts upon the piston 32 to drive the piston 32, the piston rod 34 and the head 44 in a forward or right-hand direction as viewed in FIGURES 1, 2 and 3. As the chamber 50 in the head member 46 is under predetermined air or fluid pressure controlled by the regulator 136, the diaphragm 52 is normally held in the relative position shown in FIGURE 3 during forward movements of the head 44.

The initial movement of the head 44 engages the frusto-conically shaped cam surface 66 with the rollers 170, this action tilting the arms or members 150 about their pivot shafts 152 to move the plungers 145 and the ferrule crimping portions 146 into contact with or adjacent to the exterior surface of the ferrule 99 as shown in FIGURE 10. The forward movement of the head 44 projects the tapered mandrel 120 longitudinally through the segments 106 to progressively move the segments 106 radially outwardly together with the portions 110 of the segments within the nipple 92 to initiate expansion of the nipple 92.

So long as the force required in expanding the segments under the influence of mandrel 120 does not exceed the fluid pressure established in the chamber 50, the mandrel will move forwardly with the head 44 without any lost motion or independent relative movement. When the head 44 has advanced to a position where the ferrule crimping portions 146 are in the position shown in FIGURE 10, the rollers 170 have been moved into engagement with the frusto-concially shaped cam surface 67.

As the head 44 moves further forward, the angularity of the cam surface 67, through the medium of the fingers 150, effects further inward radial movement of the plungers 145 and the portions 146 to contract, distort or crimp the ferrule 99 throughout substantially its periphery, this action compressing the portion of the hose 97 adjacent the ferrule. Concomitantly therewith the forward movement of the tapered mandrel 120 progressively expands the nipple 92 outwardly, likewise compressing the mandrel of the hose adjacent the nipple.

Thus the material of the hose disposed between the ferrule and the nipple is subjected to both internal and external compression to thereby establish an effective permanent sealed or fluid tight connection between the hose and the nipple. This method of utilizing dual compression forces applied internally and externally to the hose do not appreciably affect or stress the reinforcing fabric 97 in the hose so that there is no weakening of the fabric reinforcement in joining the nipple of a threaded coupling to a hose.

The ferrule is crimped or contracted to a maximum amount as determined by the diameter of the cylinder or drum portion 69 joined with the cam surface 67 as the rollers 170 engaging the drum surface 69 do not effect further inward radial movement of the ferrule crimping portions 146. The mandrel 120 however continues its forward movement with the head 44 to further expand the nipple 92 until the forces resisting outward movement of the segments 110 in performing this nipple expanding function exceeds the fluid pressure in chamber 50.

When this occurs, the air or gas in the chamber 50 is compressed by relative flexing movement of the diaphragm 52 as the mandrel 120 ceases its forward movement but the head 44 moves an additional distance forward until the abutment screw 182 actuates the movable component 190 of the micro switch 188 to energize the circuit through the coil 202 of the solenoid 200.

When the solenoid 200 is energized, the valve means in housing 195 is moved to a position establishing communication of the tube 38 with the air outlet or waste tube 198 and the tube 40 with the air pressure supply in the pipe 196 to direct fluid under pressure through the pipe 40 into the right-hand end of the cylinder 30 of the actuator.

The injection of fluid under pressure in the right-hand end of the actuator is effective to move the piston 32, the piston rod 34 and the head 44 in a rearward direction until the various movable components carried by the head are restored to their initial positions illustrated in FIGURE 3. At the initial retractive movement of the head 44 the air pressure in chamber 50 flexes the diaphragm to move the mandrel 120 and plate 126 to their initial relative positions in preparation for the next cycle of operations.

The coupling construction at the completion of the cycle of operations is illustrated in FIGURES 13 and 14. The ferrule 99 has been crimped to form the slightly curved sections or facets 100, these portions being embedded in the exterior surface region of the hose 97 exerting inwardly directed compression forces on the rubber or material of the hose. The nipple 92, in its expanded position as shown in FIGURES 13 and 14, exerts outwardly directed compressive forces on the hose and the ridges 114 embedded in the interior surface region of the hose.

With this method of securing a ferrule and nipple to a hose, the reinforcing textile 97 is not appreciably affected or distorted so that there is no weakening of the reinforcement. In unreinforced plastic hose this method of establishing dual compression by distortion of the nipple and ferrule provides greater resistance to cold flow of the plastic and an improved connection is thereby established.

As soon as the diaphragm 52 and plate 126 are restored during retraction of the head 44 to their normal relative positions, the abutment screw 182 is withdrawn from engagement with the movable component 190 of the micro switch 188 thus de-energizing the circuit through the coil 202 of the solenoid 200 in preparation for a subsequent processing operation which is initiated by operation of the foot operated switch 204.

As the mandrel 120 is withdrawn rearwardly away from the segments 106 and 110, the resilient means 118 surrounding the segments 106 biases the segments inwardly to release the sections or segment portions 110 from the nipple 92 so that the completed assembled hose fitting or coupling and hose may be removed from the hub portion 88 of the member 86. In full retracted position of the head 44, the springs 162, acting upon the fingers 150, move the plungers 145 and the ferrule crimping portions 146 to their outermost positions shown in FIGURE 3 to permit withdrawal through the opening 149 in the plate 147 of the assembled coupling and hose end.

The extent of outward expansion of the nipple 92 may be controlled by modifying the fluid pressure established and maintained in the chamber 50 as the mandrel 120 in its forward movement will continue to expand the nipple until the resistance to expansion of the nipple exceeds the fluid pressure in the chamber 50. When this occurs, the diaphragm 52 is moved to the position illustrated in FIGURE 4 to interrupt further forward movement of the head 44 by actuation of the micro switch 188 causing actuation of the valve means 194 to a position to connect pipe 40 with the compressed air supply and thereby effect retraction of the piston and head 44.

It is apparent that, within the scope of the invention, modifications and different arrangements may be made other than as herein disclosed, and the present disclosure is illustrative merely, the invention comprehending all variations thereof.

We claim:

1. Apparatus for securing hose fittings to hose ends wherein a nipple of the fitting extends into a hose end and a ferrule surrounds the exterior of the hose end, in combination, means for supporting a hose fitting, a nipple expanding means, a ferrule crimping means, motive means arranged to effect relative movement between the nipple expanding means and the ferrule crimping means to expand the nipple within the hose end and crimp the ferrule, and means set into operation when the resistance of the nipple to expansion exceeds the force of the motive means to effect disengagement of the expanding means from the nipple.

2. Apparatus for securing hose fittings to hose ends wherein a nipple of the fitting extends into a hose end and a ferrule surrounds the exterior of the hose end, in combination, means for supporting a hose fitting, a nipple expanding means, a ferrule crimping means, motive means arranged to actuate the nipple expanding means and the ferrule crimping means to concomitantly expand the nipple within the hose end and crimp the ferrule on the exterior of the hose, and means set into operation when the force actuating the nipple expanding means is exceeded by the resistance of the nipple to further expansion to withdraw the nipple expanding means and the ferrule crimping means from engagement with the nipple and ferrule respectively.

3. Apparatus for securing hose fittings to hose ends, in combination, a support, a relatively stationary head carried by the support, a relatively movable head, means on one of said heads adapted to support a hose fitting construction including a nipple in the interior of a hose end and a ferrule on the exterior of the hose end, a nipple expanding means, a ferrule crimping means, motive means for actuating the movable head, means set into operation upon movement of the movable head actuating the nipple expanding means and the ferrule crimping means to secure the nipple and ferrule to the hose, and fluid pressure biased means arranged to yield when the resistance of expanding the nipple exceeds the fluid pressure to actuate means to effect disengagement of the expanding means from the nipple.

4. Apparatus for securing hose fittings to hose ends, in combination, a support, a relatively stationary head carried by the support, a relatively movable head, means on one of said heads adapted to support a hose fitting construction including a nipple in the interior of a hose end and a ferrule on the exterior of the hose end, motive means for actuating the movable head, a nipple expanding means carried by one of said heads, a ferrule crimping means carried by the other of said heads, means set into operation upon movement of the movable head actuating the nipple expanding means and ferrule crimping means to secure the nipple and ferrule to the hose, and fluid pressure biased means arranged to yield when the resistance of expanding the nipple exceeds the fluid pressure to interrupt expansion of the nipple, and means actuated by said pressure biased means to initiate movement of the relatively movable head away from the stationary head.

5. Apparatus for securing a hose fitting to a hose end, in combination, a frame, a motor mounted by the frame, an element arranged to be reciprocated by the motor, a first member, a second member, one of said members being supported by and movable with said element, the other of said members being mounted by the frame, means associated with said second member arranged to receive and support a hose fitting equipped with a nipple portion adapted to extend into a hose end, a plurality of plungers carried by said second member adapted to be moved to engage a ferrule on the exterior of the hose end, cam means carried by said first member, nipple expanding means, said cam means and said nipple expanding means being arranged whereby relative movement of the movable member actuates the nipple expanding means to expand the nipple and actuates the cam means to effect movement of said plungers to contract the ferrule and thereby secure the hose end between the expanded nipple and the contracted ferrule.

6. Apparatus for securing a hose fitting to a hose end, in combination, a frame, a motor mounted by the frame, an element arranged to be reciprocated by the motor, a first member, a second member, one of said members being supported by and movable with said element, the other of said members being mounted by the frame, means associated with said second member arranged to receive and support a hose fitting equipped with a nipple portion adapted to extend into a hose end, a plurality of radially arranged plungers carried by said second member adapted to be moved inwardly to engage a ferrule on the exterior of the hose end, cam means carried by said first member, nipple expanding means mounted by said first member, said cam means and said nipple expanding means being arranged whereby relative movement of the movable member actuates the nipple expanding means to expand the nipple and concomitantly actuates the cam means to move said plungers to crimp the ferrule and thereby secure the hose end between the expanded nipple and the crimped ferrule.

7. Apparatus for securing hose fittings to hose ends, in combination, a support, a relatively stationary head carried by the support, a relatively movable head, means on one of said heads adapted to support a hose fitting construction including a nipple in the interior of a hose end and a ferrule on the exterior of the hose end, motive means for actuating the movable head, a nipple expanding mandrel mounted by one of said heads, a ferrule crimping means carried by the other of said heads, means set into operation upon movement of the movable head actuating the nipple expanding mandrel and ferrule crimping means to secure the nipple and ferrule to the hose, a chamber formed in the head mounting the mandrel, a diaphragm in said chamber connected with the mandrel, means for establishing gas pressure in said chamber, said diaphragm being adapted to compress the gas in the chamber when the resistance of expanding the nipple exceeds the pressure in said chamber to interrupt expansion of the nipple, and means actuated by relative movement of the diaphragm to initiate movement of the relatively movable head away from the stationary head.

8. Apparatus for securing hose ends to hose fittings, in combination, a frame, a motor mounted by the frame, an element arranged to be reciprocated by the motor, a first member, a second member, one of said members being supported by and movable with said element, the other of said members being mounted by the frame, means associated with said second member arranged to receive and support a hose fitting equipped with a nipple portion adapted to extend into a hose end, a plurality of radially arranged plungers carried by said second member adapted to be moved inwardly to engage a ferrule on the exterior of the hose end, cam means carried by said first member, nipple expanding means mounted by said first member, said cam means and said nipple expanding means being arranged whereby relative movement of the movable member actuates nipple expanding means to expand the nipple and actuate the cam means to effect radial movement of said plungers to contract the ferrule, said nipple expanding means being arranged for limited movement relative to said first member, means establishing pressure between the nipple expanding means and said first member to normally resist relative movement between said means and said first member and to permit relative movement when the resistance of the nipple exceeds the established pressure between the nipple expanding means and the first member, and means actuated upon relative movement between the nipple expanding means and the first member to actuate the motor to withdraw the nipple expanding means from the nipple and disengage the plungers from the ferrule.

9. Apparatus for securing hose ends to hose fittings, in combination, a frame, a fluid actuated motor mounted by the frame, an element arranged to be reciprocated by the motor, a first member, a second member, one of said members being supported by and movable with said element, the other of said members being mounted by the frame, means associated with said second member arranged to receive and support a hose fitting equipped with a nipple portion adapted to extend into a hose end, a plurality of radially arranged plungers carried by said second member adapted to be moved inwardly to engage a ferrule on the exterior of the hose end, cam means carried by said first member, nipple expanding means carried by said first member, said cam means and said nipple expanding means being arranged whereby relative movement of one of said members with respect to the other moves the nipple expanding means to expand the nipple and the cam means to effect radial movement of said plungers to contract the ferrule, a chamber formed in said first member, a diaphragm forming a wall of said chamber, said nipple expanding means being connected with the diaphragm for limited movement relative to said first member, means establishing gas pressure in said chamber adapted to normally resist movement of the nipple expanding means relative to said first member but to permit such relative movement when the force of expanding the nipple exceeds the established gas pressure in said chamber, and means actuated upon relative movement between the nipple expanding means and the first member to actuate the motor and thereby withdraw the nipple expanding means from the nipple and disengage the plungers from the ferrule.

References Cited

UNITED STATES PATENTS

| | | | |
|---|---|---|---|
| 2,292,421 | 8/1942 | Wolf | 29—508 |
| 2,377,829 | 6/1945 | Vaill | 29—237 X |
| 2,427,685 | 9,1947 | Midtlyng et al. | 29—507 X |
| 2,562,116 | 7/1951 | Nelson | 285—258 |
| 2,622,652 | 12/1952 | Conroy et al. | 29—237 |
| 2,797,474 | 7/1957 | Main | 29—506 |
| 2,808,643 | 10/1957 | Weatherhead | 29—508 |
| 2,825,588 | 3/1958 | Howard | 285—258 |
| 2,865,094 | 12/1958 | Press | 29—506 |
| 3,083,750 | 4/1963 | Macleod et al. | 29—208 |

CHARLIE T. MOON, *Primary Examiner.*

CARL W. TOMLIN, WHITMORE A. WILTZ,
*Examiners.*

T. F. CALLAGHAN, *Assistant Examiner.*